US011245957B2

(12) United States Patent
Peterson et al.

(10) Patent No.: US 11,245,957 B2
(45) Date of Patent: Feb. 8, 2022

(54) USER PROFILE SHARING

(71) Applicant: Lenovo (Singapore) Pte. Ltd., Singapore (SG)

(72) Inventors: Nathan J. Peterson, Oxford, NC (US); Russell Speight VanBlon, Raleigh, NC (US); Arnold S. Weksler, Raleigh, NC (US); Mark Patrick Delaney, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/460,659

(22) Filed: Jul. 2, 2019

(65) Prior Publication Data

US 2021/0006858 A1 Jan. 7, 2021

(51) Int. Cl.
*H04N 21/4367* (2011.01)
*H04L 29/06* (2006.01)
*H04L 29/08* (2006.01)

(52) U.S. Cl.
CPC ..... *H04N 21/4367* (2013.01); *H04L 63/0884* (2013.01); *H04L 67/306* (2013.01)

(58) Field of Classification Search
CPC ............ H04N 21/4367; H04L 63/0884; H04L 67/306
USPC .......................................................... 725/114
See application file for complete search history.

(56) References Cited

U.S. PATENT DOCUMENTS

| | | | | |
|---|---|---|---|---|
| 10,110,577 | B2* | 10/2018 | Welday, Jr. | H04L 63/08 |
| 10,218,506 | B1* | 2/2019 | Bhabbur | G06F 3/0304 |
| 10,701,120 | B2* | 6/2020 | Taylor | H04L 65/4084 |
| 2007/0155307 | A1* | 7/2007 | Ng | H04L 67/306 |
| | | | | 455/3.01 |
| 2011/0151835 | A1* | 6/2011 | Velusamy | H04M 1/66 |
| | | | | 455/411 |
| 2012/0297466 | A1* | 11/2012 | Li | G06F 21/42 |
| | | | | 726/7 |
| 2014/0165151 | A1* | 6/2014 | Welday, Jr. | H04L 63/08 |
| | | | | 726/4 |
| 2014/0208112 | A1* | 7/2014 | McDonald | H04L 63/0435 |
| | | | | 713/171 |

(Continued)

*Primary Examiner* — Nathan J Flynn
*Assistant Examiner* — Caroline Somera
(74) *Attorney, Agent, or Firm* — Ference & Associates LLC

(57) ABSTRACT

One embodiment provides a method, including: identifying, using a sensor of an information handling device, a proximate device to the information handling device; determining, using a processor of the information handling device, whether the proximate device comprises a compatible application; presenting, on the information handling device and responsive to determining that the proximate device does comprise the compatible application, a non-native user profile associated with the compatible application; receiving, on the presented non-native user profile, activation input from a user; transmitting, responsive to receiving the activation input, an authentication request to the proximate device; and providing, responsive to receiving authentication approval in response to the authentication request from the proximate device, access to the non-native user profile on the information handling device. Other aspects are described and claimed.

18 Claims, 3 Drawing Sheets

(56) References Cited

U.S. PATENT DOCUMENTS

| | | | | |
|---|---|---|---|---|
| 2015/0278510 | A1* | 10/2015 | Alexander | H04W 12/0802 |
| | | | | 726/6 |
| 2016/0057140 | A1* | 2/2016 | Heeter | H04L 67/16 |
| | | | | 726/4 |
| 2016/0135014 | A1* | 5/2016 | Alharayeri | H04L 67/28 |
| | | | | 455/456.3 |
| 2019/0034621 | A1* | 1/2019 | Mondello | G06F 21/44 |
| 2019/0372989 | A1* | 12/2019 | Shultz | H04W 4/023 |
| 2020/0067901 | A1* | 2/2020 | Marchand | G06F 21/35 |
| 2020/0210604 | A1* | 7/2020 | Graf | H04W 4/023 |
| 2020/0380510 | A1* | 12/2020 | Hare | G06Q 20/10 |

* cited by examiner

USER PROFILE SHARING

BACKGROUND

Many individuals today are subscribed to one or more types of streaming services. These services enable subscribers to obtain access to a variety of different types of digital media content, for example, movies, television shows, songs, video clips, games, and the like. Due to the mobile nature of many information handling devices ("devices"), for example, smart phones, tablet devices, laptop computers, and the like, subscribers may be able to access the digital media content from a variety of different locations.

BRIEF SUMMARY

In summary, one aspect provides a method, comprising: identifying, using a sensor of an information handling device, a proximate device to the information handling device; determining, using a processor of the information handling device, whether the proximate device comprises a compatible application; presenting, on the information handling device and responsive to determining that the proximate device does comprise the compatible application, a non-native user profile associated with the compatible application; receiving, on the presented non-native user profile, activation input from a user; transmitting, responsive to receiving the activation input, an authentication request to the proximate device; and providing, responsive to receiving authentication approval in response to the authentication request from the proximate device, access to the non-native user profile on the information handling device.

Another aspect provides an information handling device, comprising: a sensor; a processor; a memory device that stores instructions executable by the processor to: identify, using the sensor, a proximate device to the information handling device; determine whether the proximate device comprises a compatible application; present, on the information handling device and responsive to determining that the proximate device does comprise the compatible application, a non-native user profile associated with the compatible application; receive, on the presented non-native user profile, activation input from a user; transmit, responsive to receiving activation input, an authentication request to the proximate device; and provide, responsive to receiving authentication approval in response to the authentication request from the proximate device, access to the non-native user profile on the information handling device.

A further aspect provides a product, comprising: a storage device that stores code, the code being executable by a processor and comprising: code that identifies a proximate device to an information handling device; code that determines whether the proximate device comprises a compatible application; code that presents, on the information handling device and responsive to determining that the proximate device does comprise the compatible application, a non-native user profile associated with the compatible application; code that receives, on the presented non-native user profile, activation input from a user; code that transmits, responsive to receiving the activation input, an authentication request to the proximate device; and code that provides, responsive to receiving authentication approval in response to the authentication request from the proximate device, access to the non-native user profile on the information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
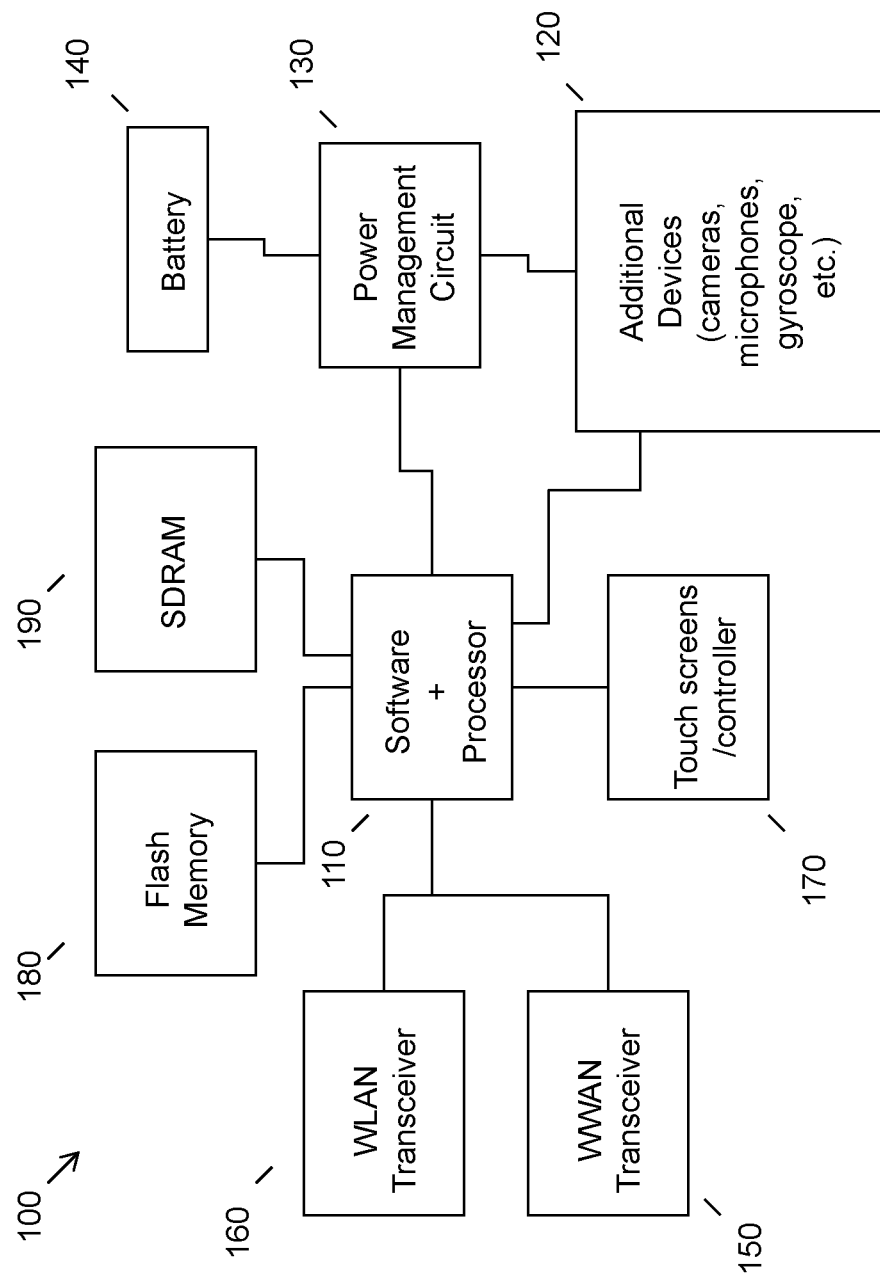
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Individuals traveling away from their home, or their home network, may nevertheless be able to obtain access to their streaming services through various means. For example, individuals may utilize their mobile devices to access streamed digital media content by connecting to either a mobile or wireless network. Alternatively, individuals may be able to sign into their user profile associated with a particular streaming service on another individual's device. Once access is granted, individuals may be able to consume their streamed content on the other individual's device.

Issues exist with the foregoing methods of obtaining access to content streams. For example, generally, users are unable to perform other tasks when streaming content on their mobile device (e.g., watching a movie, etc.). Additionally, the battery life of the mobile device will be depleted much quicker when a user is streaming. As another example, the requirement to log into a user profile may be burdensome and time-consuming. Furthermore, individuals frequently forget to log out of their user profile when leaving a temporary location, thereby unintentionally granting access to their streaming services associated with their user profile to one or more other individuals.

Accordingly, an embodiment provides a method for providing access to a non-native user profile on a user's device. In an embodiment, a proximate device may first be identified. The proximate device may be a device within a predetermined distance of a user's device, a device connected to the same network as the user's device, etc. An embodiment may then determine whether the proximate device has a compatible application (e.g., an application installed and/or currently running on both: the user's device and the proximate device, etc.). Responsive to reaching a positive determination, an embodiment may then present an indication of a non-native user profile associated with the compatible application on the user's device. The non-native user profile may be a profile that is not stored on the user's device and/or associated with any streaming profile that the user's device has access to. Responsive to receiving activation input from a user on the non-native user profile, an embodiment may transmit an authentication request to the other device. If an authentication approval is received back from the other device in response to the authentication request, an embodiment may thereafter provide access to the non-native user profile on the user's device. Such a method, may allow users to share their profiles, and allowances associated with those profiles, on other devices located in temporary locations (i.e., locations that a user does not often frequent, locations that a user does not consider to be associated with a home, etc.).

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
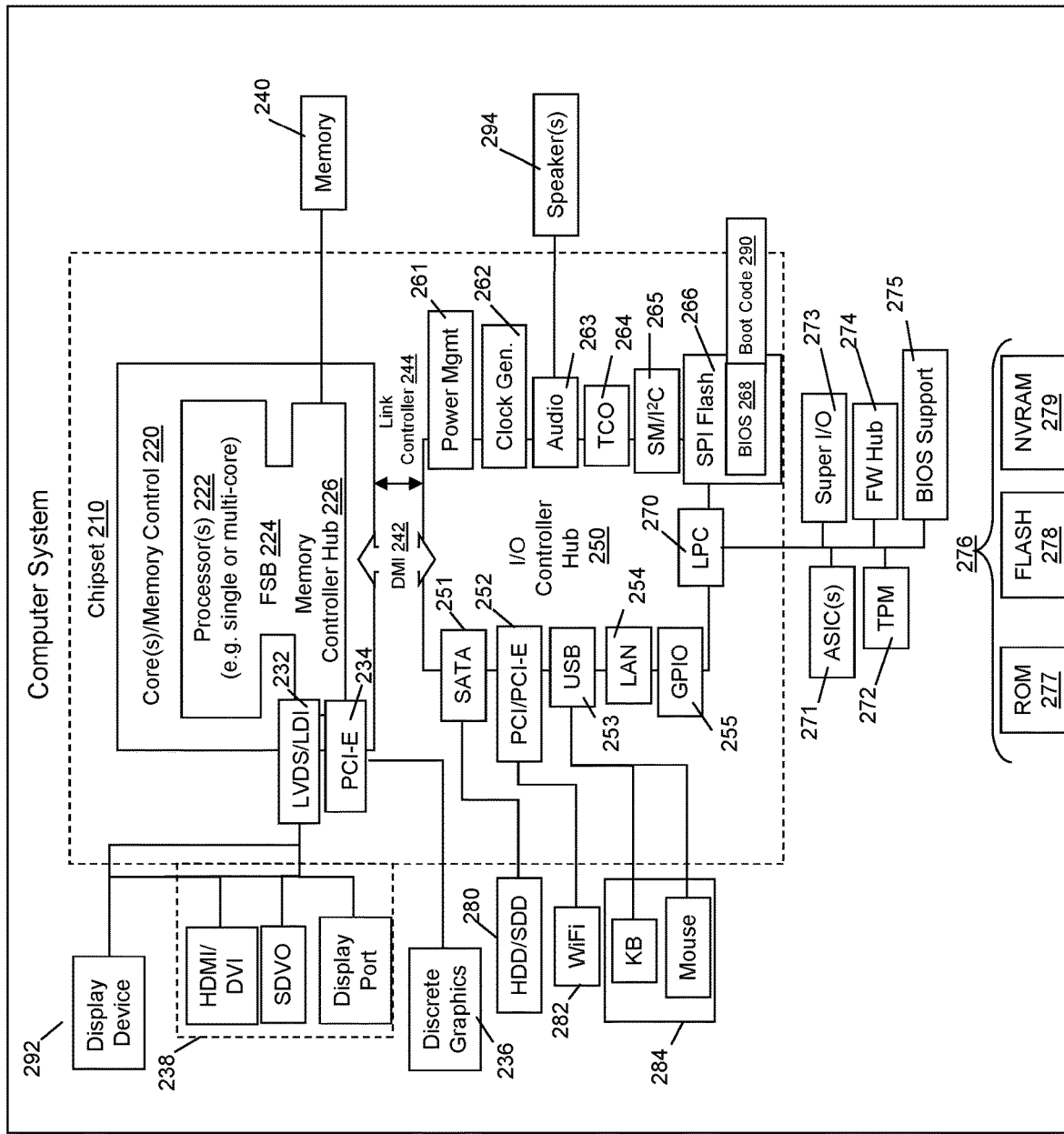
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS

268. As described herein, a device may include fewer or more features than shown in the system of FIG. 2.

Information handling device circuitry, as for example outlined in FIG. 1 or FIG. 2, may be used in devices such as smart phones, tablets, laptops, hybrid devices, and/or other electronic devices that may be capable of streaming media content and communicating with other devices. For example, the circuitry outlined in FIG. 1 may be implemented in a tablet or smart phone embodiment, whereas the circuitry outlined in FIG. 2 may be implemented in a laptop.

Figure 3:
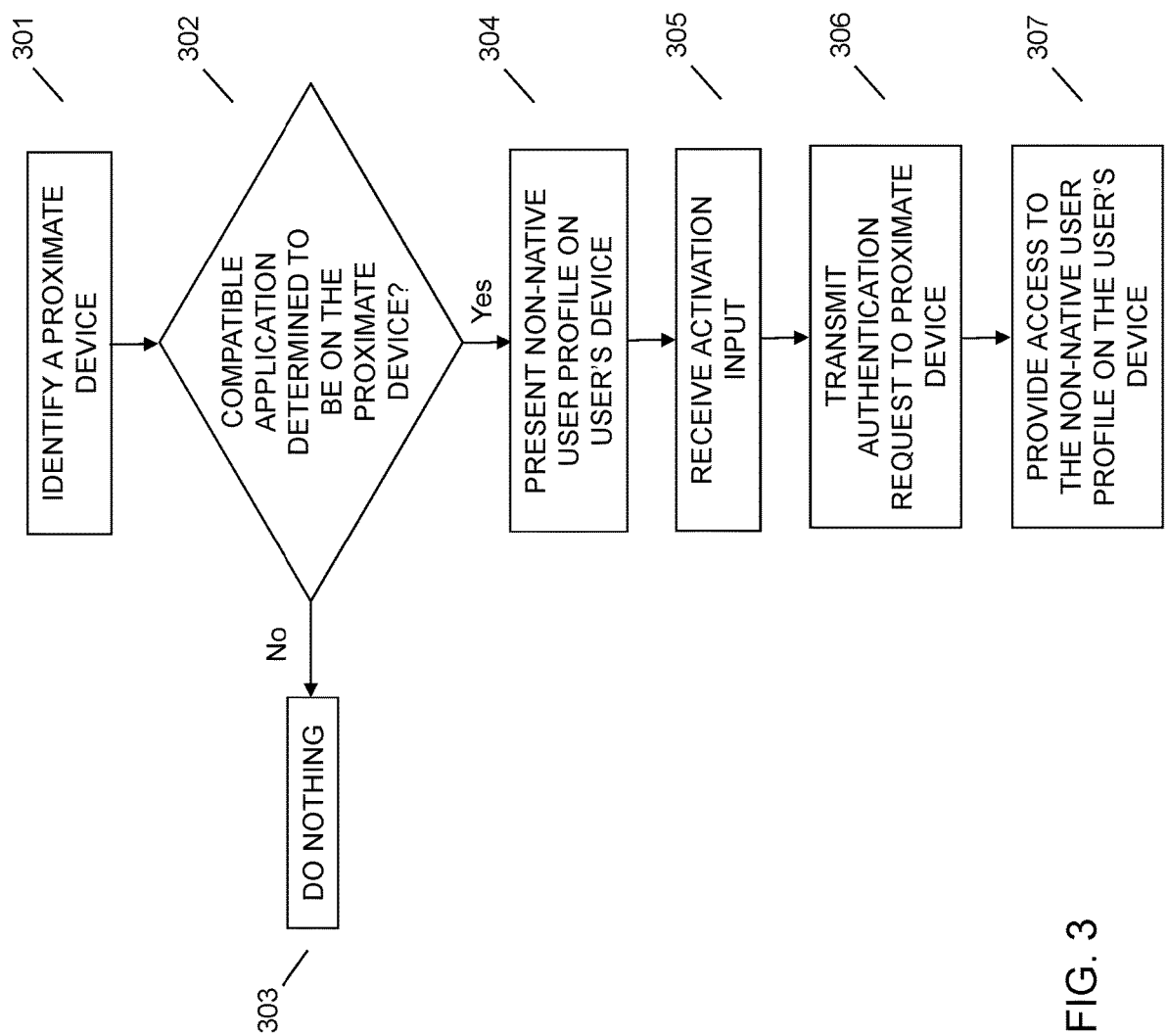
FIG. 3 illustrates an example method of providing access to a non-native user profile on a device.

Referring now to FIG. 3, an embodiment may play streamed content associated with a non-native user profile on a user's device. At 301, an embodiment may identify a proximate device to the user's device. In an embodiment, the user's device and the proximate device may be virtually any device capable of playing streamed media content (e.g., a smart or conventional television, a laptop or personal computer, a smart phone, a tablet, a hybrid device, etc.). An embodiment may identify that a device is a proximate device via one or more techniques. For example, in an embodiment, a proximate device may be identified responsive to detecting that another device is within a predetermined distance of the user's device. As another example, a proximate device may be identified responsive to detecting that another device has connected to the same network as the user's device.

At 302, an embodiment may determine whether the proximate device has a compatible application. In the context of this application, a compatible application may be an application that is installed on both: the user's device and the proximate device. For example, a compatible application may be a particular type of media streaming application (e.g., for streaming movies, television shows, etc.) that is installed on both devices.

In an embodiment, the determination may be conducted using one or more methods. For example, in an embodiment, the proximate device may transmit a list of certain applications installed on the proximate device (e.g., all installed applications, all installed streaming-based applications, a subset of installed applications, etc.) to any other proximate or connected devices. Responsive to receiving the transmission, the user's device may run a check to identify if there is a match between any applications in the received list and any applications installed on the user's device. Any identified matches may be considered compatible applications. Alternatively, in another embodiment, the user's device may send a transmission to each newly identified proximate device to request a list of installed applications on the proximate device. Responsive to receiving a feedback list from the proximate device, the user's device may determine whether a compatible application exists by identifying if there is a match as previously discussed. In an embodiment, the determination may be conducted on the user's device or on another device or server.

Responsive to determining, at 302, that the proximate device does not comprise a compatible application, an embodiment may, at 303, take no additional action. Conversely, responsive to determining, at 302, that the proximate device does comprise a compatible application, an embodiment may, at 304, present a non-native user profile associated with the compatible application on the user's device.

In the context of this application, a non-native user profile may be a profile that is not installed on the user's device and/or is not commonly accessed by the user's device when streaming. Additionally or alternatively, the non-native user profile may be a profile that is associated with the proximate device. In an embodiment, the presentation of the non-native user profile may be implemented via one or more means. For example, an embodiment may provide an audible or visual notification that a non-native user profile exists. As another example, an embodiment may co-display the non-native user profile concurrently with native user profiles on a display screen of the user's device.

Responsive to receiving, at 305, activation input on the non-native user profile (e.g., by user selection of the non-native user profile, etc.), an embodiment may, at 306, transmit an authentication request to the proximate device. In an embodiment, the authentication request may be a request to access streaming content via the non-native user profile on the user device. In an embodiment, the transmission of the authentication request may prompt a notification to be generated on the proximate device. The notification may include a query to a user of the proximate device asking if they agreed to authorize access to the non-native user profile on the user's device. Alternatively, in another embodiment, a list of pre-approved devices that are authorized to access the non-native user profile may be stored on the proximate device, or at another accessible storage location. In this situation, an embodiment may automatically authorize access to the non-native user profile on another device if that device is on the pre-approval list.

If authentication approval is not received from the proximate device, then an embodiment may take no further action. Conversely, if authentication approval is received from the proximate device, then an embodiment may, at 307, provide access to the non-native user profile on the user's device.

In an embodiment, the provision of access may allow the user's device access to authorized content associated with the non-native user profile. As a non-limiting, practical example of the foregoing processes, a user's friend may come over to the user's house. The friend may be able to provide access to their user profile for a particular streaming account on the user's smart TV. Once access is granted, then content of the streaming account authorized by the friend's profile may be played.

In an embodiment, a service level associated with the non-native user profile may be migrated over to the user's device. Using the foregoing example, if the friend's profile for the streaming account included more allowances for the streaming account than any existing user profile on the user's device (e.g. more streamable television channels, movies, songs etc.), then those allowances would also be available on the user's device if account access to the friend's profile was granted.

Many streaming services provide their users with a simultaneous streaming allotment. The simultaneous streaming allotment identifies the number of user profiles under a particular user account that may simultaneously stream content at any given time. If the number is exceeded, then access to streamed content may be denied or discontinued on one or more of the user profiles. In an embodiment, when the user's device is streaming content via the non-native user profile, a streaming allotment for the user account may be unaffected. More particularly, as an example, if a user account comprises a simultaneous streaming allotment of 3 user profiles, a non-native user profile may simultaneously stream content along with 3 other user profiles without experiencing or causing any interruptions in service.

In an embodiment, access to the non-native user profile may be granted for a predetermined period of time (e.g., 30 minutes, 1 hour, 24 hours, etc.). The designation of the predetermined length of access may be originally set by a manufacturer and/or later adjusted by a user. Once the predetermined period of time has expired, an embodiment may automatically discontinue access to the non-native user profile. In another embodiment, access to the non-native user profile may be automatically discontinued responsive to identifying that the other device is no longer a proximate device. More particularly, access may be discontinued responsive to identifying that the other device has moved outside the threshold distance of proximity and/or has disconnected from a network associated with the user's device. In yet another embodiment, access to the non-native user profile may be discontinued responsive to receiving an access retraction command from the proximate device. In this situation, a user of the proximate device may have provided a command, on the proximate device, to discontinue the granting of access to the non-native user profile on the user device.

The various embodiments described herein thus represent a technical improvement to conventional user profile sharing techniques. Using the techniques described herein, an embodiment may first identify a proximate device and then determine whether a compatible application is installed or running on the proximate device. An embodiment may then present, on the user's device, a non-native user profile originating from the proximate device and associated with the compatible application. Responsive to receiving an activation input on the non-native user profile on the user's device, an embodiment may transmit an authentication request to the proximate device. If an authentication approval is subsequently received from the proximate device, an embodiment may provide access to the non-native user profile on the user's device. Access to the non-native user profile may subsequently be revoked, or discontinued, responsive to identifying that a predetermined period of time has expired, the proximate device can no longer be detected, an explicit access revocation request is received, etc. Such a method may provide a secure, simple, and effective way for users to share their user profiles on other devices in temporary locations.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying, using a sensor of an information handling device, a proximate device to the information handling device, wherein the information handling device is associated with a user and wherein the proximate device is associated with another user;
   determining, using a processor of the information handling device, whether the proximate device comprises a compatible application;
   presenting, on the information handling device and responsive to determining that the proximate device does comprise the compatible application, a non-native user profile associated with the compatible application, wherein the non-native user profile is associated with the another user;

receiving, on the presented non-native user profile, activation input from the user;

transmitting, responsive to receiving the activation input, an authentication request to the proximate device;

enabling, responsive to receiving authentication approval in response to the authentication request from the proximate device, access to the non-native user profile on the information handling device, wherein the enabling of the access does not affect a streaming allotment associated with the non-native user profile; and providing media content associated with the compatible application on the information handling device, wherein the providing comprises migrating a service level associated with the non-native user profile onto the information handling device;

wherein the service level comprises a listing of allowances for the compatible application.

2. The method of claim 1, wherein the identifying comprises determining that the proximate device is within a predetermined distance from the information handling device.

3. The method of claim 1, wherein the identifying comprises determining that the proximate device and the information handling device are connected to an identical network.

4. The method of claim 1, wherein the compatible application is an application resident on both of the information handling device and the proximate device.

5. The method of claim 1, wherein the providing comprises playing content specific to the non-native user profile on the information handling device.

6. The method of claim 1, wherein the providing comprises utilizing a stream allotment associated with the non-native user profile.

7. The method of claim 1, wherein the providing comprises providing access to the non-native user profile for a predetermined period of time.

8. The method of claim 1, further comprising automatically disconnecting from the non-native user profile responsive to identifying that the proximate device has moved a predetermined distance away from the information handling device.

9. The method of claim 1, further comprising automatically disconnecting from the non-native user profile responsive to receiving a log-off indication from the proximate device.

10. An information handling device, comprising:
a sensor;
a processor;
a memory device that stores instructions executable by the processor to:
identify, using the sensor, a proximate device to the information handling device, wherein the information handling device is associated with a user and wherein the proximate device is associated with another user;
determine whether the proximate device comprises a compatible application;
present, on the information handling device and responsive to determining that the proximate device does comprise the compatible application, a non-native user profile associated with the compatible application, wherein the non-native user profile is associated with the another user;

receive, on the presented non-native user profile, activation input from the user;

transmit, responsive to receiving activation input, an authentication request to the proximate device;

enable, responsive to receiving authentication approval in response to the authentication request from the proximate device, access to the non-native user profile on the information handling device, wherein the enabling of the access does not affect a streaming allotment associated with the non-native user profile; and provide media content associated with the compatible application on the information handling device, wherein the providing comprises migrating a service level associated with the non-native user profile onto the information handling device;

wherein the service level comprises a listing of allowances for the compatible application.

11. The information handling device of claim 10, wherein the instructions executable by the processor to identify comprise instructions executable by the processor to identify that the proximate device is within a predetermined distance to the information handling device.

12. The information handling device of claim 10, wherein the instructions executable by the processor to identify comprise instructions executable by the processor to identify that the proximate device and the information handling device are connected to an identical network.

13. The information handling device of claim 10, wherein the compatible application is an application resident on both of the information handling device and the proximate device.

14. The information handling device of claim 10, wherein the instructions executable by the processor to provide comprise instructions executable by the processor to play content specific to the non-native user profile on the information handling device.

15. The information handling device of claim 10, wherein the instructions executable by the processor to provide comprise instructions executable by the processor to utilize a stream allotment associated with the non-native user profile.

16. The information handling device of claim 10, wherein the instructions are further executable by the processor to automatically disconnect from the non-native user profile responsive to identifying that the proximate device has moved a predetermined distance away from the information handling device.

17. The information handling device of claim 10, wherein the instructions are further executable by the processor to automatically disconnect from the non-native user profile responsive to receiving a log-off indication from the proximate device.

18. A product, comprising:
a storage device that stores code, the code being executable by a processor and comprising:
code that identifies a proximate device to an information handling device, wherein the information handling device is associated with a user and wherein the proximate device is associated with another user;
code that determines whether the proximate device comprises a compatible application;
code that presents, on the information handling device and responsive to determining that the proximate device does comprise the compatible application, a non-native user profile associated with the compatible application, wherein the non-native user profile is associated with the another user;

code that receives, on the presented non-native user profile, activation input from the user;

code that transmits, responsive to receiving the activation input, an authentication request to the proximate device;

code that enables, responsive to receiving authentication approval in response to the authentication request from the proximate device, access to the non-native user profile on the information handling device, wherein the code that enables the access does not affect a streaming allotment associated with the non-native user profile; and code that provides media content associated with the compatible application on the information handling device, wherein the providing comprises migrating a service level associated with the non-native user profile onto the information handling device;

wherein the service level comprises a listing of allowances for the compatible application.

* * * * *